Dec. 5, 1939.     R. C. GIBSON     2,181,883
COMBINATION BRAKE AND ACCELERATOR CONTROL
Filed May 23, 1938
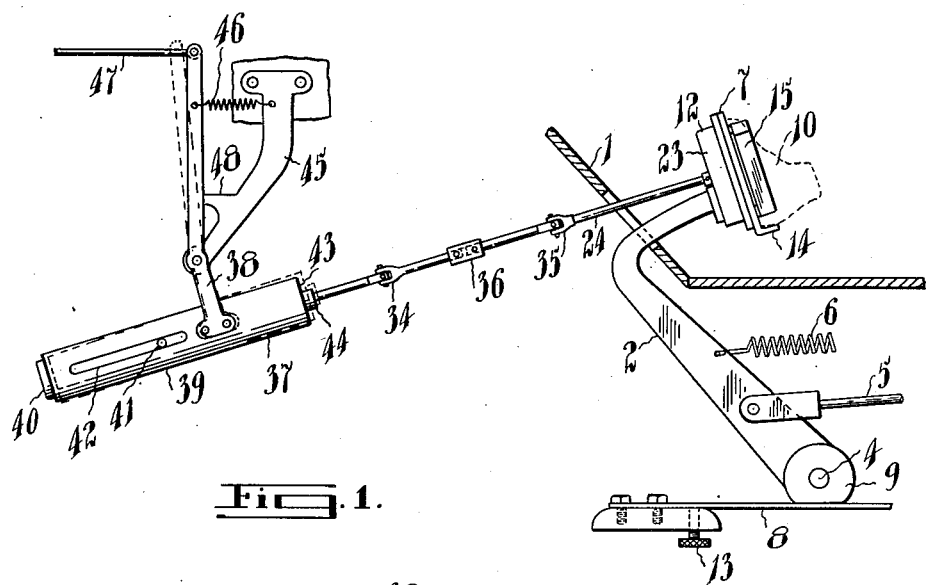
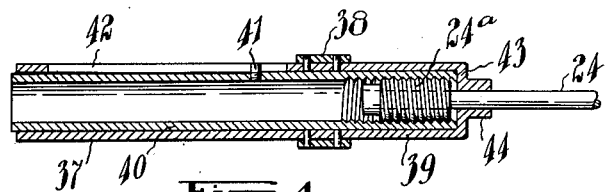
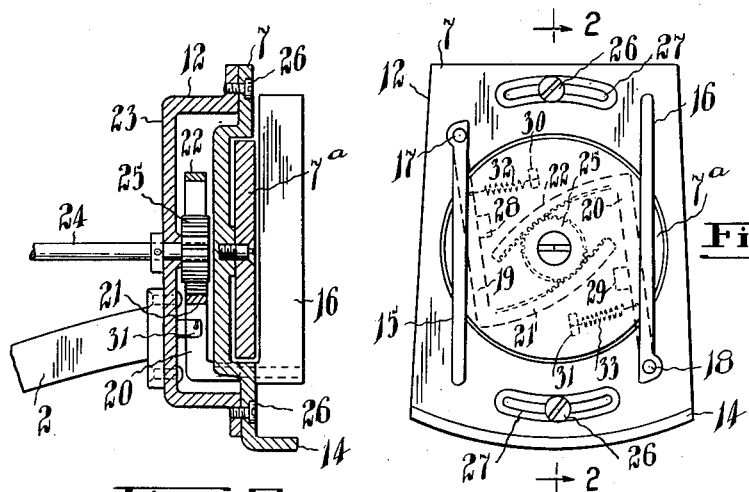
Inventor
R. C. Gibson
by J. Edw. Maybee
ATTY Patented Dec. 5, 1939

2,181,883

UNITED STATES PATENT OFFICE 2,181,883

COMBINATION BRAKE AND ACCELERATOR CONTROL

Robert C. Gibson, Toronto, Ontario, Canada

Application May 23, 1938, Serial No. 209,501

18 Claims. (Cl. 74—513)

This invention relates particularly to apparatus adapted to control the throttle and brakes of a motor vehicle.

In the past it has been customary to have separate pedals for the brake and for the throttle control. These pedals were usually operated by the same foot. In moving the foot from the throttle control pedal to the brake pedal, considerable time was lost, which in a case of an emergency was very valuable. My object in the present invention therefore is to provide a control for motor vehicles in which the throttle and brake can be controlled without changing the foot from one pedal to another.

Means are also provided for closing the throttle when the brake is applied.

I attain my object by means of the construction which may be briefly described as follows.

A foot brake lever has a foot plate provided with a heel rest. Pivoted on the foot plate are two throttle control arms. These arms are spaced apart sufficiently to allow the driver's foot to be placed between them and are operated by a twisting movement of the driver's foot on the plate. Means are also provided for closing of the throttle when the brake lever is depressed should the driver neglect to do so before applying the brake.

The invention is hereinafter more fully described and illustrated in the accompanying drawing in which Fig. 1 is a side view of the complete control means showing in dotted lines the position of the throttle actuating device when the throttle is partly open;

Fig. 2 is a section of the complete foot plate on line 2—2 in Fig. 3;

Fig. 3 a plan view of the foot plate; and

Fig. 4 a section of the throttle actuating device.

In the drawing like numerals of reference indicate corresponding parts in the different figures.

1 is the usual floor boards of a motor vehicle through which passes the brake lever 2 carried by a pivot 4 on a suitable stationary part. Connected to the brake lever 2 is the brake rod 5 and brake lever return spring 6. Carried on the upper end of the brake lever 2 is the throttle control means 12 and the foot plate 7 on which rests the driver's foot 10. To tend to keep the brake pedal in its inoperative position and to offset the weight of the driver's foot while resting on the foot plate 7 a flat spring 8 bears against a flattened portion of the hub 9 of the lever 2. A screw 13 is provided so that the pressure of the spring against the flattened portion of the hub 9 can be adjusted to suit the driver's requirements.

The foot plate 7 has a heel rest 14 positioned at the lower end thereof.

Carried by the foot plate 7 are two control levers 15 and 16 which are secured to pivots 17 and 18 which are pivoted on the foot plate 7 at the top and bottom respectively. To the lower ends of the pivots 17 and 18, which extend through the foot plate 7, are connected arms 19 and 20 to which are in turn connected gear racks 21 and 22.

Connecting the foot plate 7 with the brake lever 2, and enclosing the arms 19 and 20 which carry the gear racks 21 and 22 is a housing 23. Through the housing 23 passes a shaft 24 which has secured to its upper end a pinion 25 which engages the gear racks 21 and 22.

Integral with the base of the housing 23 are stops 28 and 29 for the arms 19 and 20, also lugs 30 and 31 to which one end of each of the springs 32 and 33 is attached. The other ends of the springs 32 and 33 are attached to the arms 19 and 20. The springs 32 and 33 hold the arms 19 and 20 against the stops 28 and 29.

The foot plate 7 is connected to the housing 23 by means of the screws 26 which pass through slots 27 in the foot plate. The slots 27 are countersunk so as to allow the heads of the screws 27 to be flush with the top of the foot plate. By loosening the screws 27 the foot plate 7 can be adjusted to suit the position of the driver's foot.

Rotatably mounted on the plate 7 between the control levers 15 and 16 is a disc 7$^a$ which is countersunk in the foot plate 7 so that its upper surface is flush with the upper face of the foot plate. This rotatable disc facilitates the twisting of the foot on the plate as hereinafter referred to.

Connected to the shaft 24 in which are the universal couplings 34 and 35 and rigid coupling 36, is the throttle actuating device 37 which is supported by the bell crank 38 hereinafter described.

The throttle actuating device 37 has an outer sleeve 39 to which the bell crank 38 is rigidly attached. Slidably carried by the outer sleeve is an inner sleeve 40. To hold the inner sleeve 40 from rotating in the outer sleeve 39 when the threaded part 24$^a$ of the shaft 24 is rotated, a pin 41 is provided. The pin 41 is secured to the inner sleeve and passes through a slot 42 in the outer sleeve 39.

The inner surface of the sleeve 40 is threaded at one end to receive the threaded part 24$^a$ of the shaft 24.

The outer sleeve 39 has at its upper end a shoulder 43 and a bearing 44 through which the shaft 24 passes. The bell crank 38 is fulcrumed on a support 45 and is returned to the closed throttle position by the spring 46.

Connected to the bell crank 38 is a rod 47 which is connected to the control valve of the carburetter of a motor vehicle (not shown).

The adjustment of the foot plate 7 is as follows:

The coupling 36 is loosened which allows the upper part of the shaft 24 to rotate without having any effect on the throttle actuating device 37. The screws 26 are loosened so as the foot plate 7 can be rotated. The driver then places his foot on the foot plate 7 with his heel resting on the heel rest 14. The foot plate 7 is then moved in a clockwise or counter-clockwise direction, as may be necessary to give the most comfortable position to the driver's foot. The foot is then removed and the screws 26 are tightened up to lock the foot plate in the proper position. The coupling 36 on the shaft 24 is then tightened up, making sure that the inner sleeve 40 of the throttle device 37 is against the shoulder 43 of the outer sleeve 39, and that the upper part of the bell crank 38 is resting against the stop 48 on the bell crank support 45.

The operation of the device is as follows:

The driver's foot 10 is placed on the foot plate 7 with the heel against the heel rest 14.

When the driver wishes to accelerate, he raises his heel slightly keeping the ball of his foot on the disc 7a and twists his foot so that his toe presses the upper part of the lever 16 and his heel the lower part of the lever 15. This rotates the shaft 24 in a clockwise direction by means of the gear racks 21 and 22, connected to the lower arms 19 and 20 and which engage the pinion 25. The rotation of the shaft 24 and its threaded part 24a in a clockwise direction causes the inner sleeve 40 of the throttle actuating device 37 to move to the right. As the inner sleeve bears against the shoulder 43 of the outer sleeve 39 it is also moved to the right.

The movement of the lower part of the bell crank 38 to the right causes the upper end of the bell crank 38 to move to the left, which opens the throttle by means of the rod 47.

When the driver wishes to close the throttle he turns his foot to the left and the springs 32 and 33 return the control levers 15 and 16 and rotate the shaft 24 with its threaded part 24a to their original positions. The throttle actuating device 37 is returned to its original position by means of the spring 46 acting on the upper part of the bell crank 38.

Should it be desired to apply the brake when the throttle is closed, the driver depresses the foot plate 7, which moves the brake rod 5 to the left by means of the lever 2 and applies the brake. The depressing of the foot plate 7 moves the shaft 24 longitudinally. The shaft 24 being connected to the inner sleeve 40 by means of its threaded part 24a, causes the inner sleeve 40 to slide in the outer sleeve 39 away from the shoulder 43.

When the pressure on the foot plate 7 is released, the spring 6 returns the lever 2 to its original position as well as the inner sleeve 40.

If the foot plate 7 is depressed without first closing the throttle, the longitudinal movement of the shaft 24 causes the inner sleeve 40 to move away from the shoulder 43 on the outer sleeve 39. The inner sleeve not being in contact with the shoulder 43, there is nothing to resist the action of the spring 46 on the bell crank 38. The bell crank 38 is therefore moved in against the stop 48 by the spring 46. In this position the throttle is closed.

What I claim as my invention is:

1. A throttle control means for motor vehicles comprising a foot plate; two control arms pivotally mounted on the foot plate and operable by either side of the driver's foot; a shaft rotatable by each of the two arms; and a throttle actuating device connected to the shaft.

2. A throttle control means for motor vehicles comprising a foot plate; two control arms pivotally mounted at opposite ends on the foot plate, one of said arms being operable by the toe and the other being operable by the heel of the driver's foot when turned or rotated; a shaft rotatable by each of the two arms; and a throttle actuating device connected to the said shaft.

3. A throttle control means for motor vehicles comprising a foot plate; two control arms pivotally mounted on the foot plate and operable by either side of the driver's foot; operating arms extending below the foot plate and swingable by the control arms; a shaft rotatable by each of the two operating arms; and a throttle actuating device connected to the said shaft.

4. A throttle control means for motor vehicles comprising a foot plate; two control arms pivotally mounted on the foot plate and operable by either side of the driver's foot; operating arms extending below the foot plate and swingable by the control arms; a rotatable shaft; means on the operating arms to impart a rotating motion to said shaft; and a throttle actuating device connected to said shaft.

5. A throttle control means for motor vehicles comprising a foot plate; two control arms pivotally mounted on the foot plate, and operable by either side of the driver's foot; a gear rack connected to each of the said control arms; a rotatable shaft; a pinion secured to the said shaft and in engagement with each of said racks; and a throttle actuating device connected to said shaft.

6. A throttle control means for motor vehicles comprising a foot plate; two control arms pivotally mounted at opposite ends on the foot plate and one of said arms being operable by the toe of the driver's foot and the other of said arms being operated by the heel of the driver's foot when turned or rotated; operating arms extending below the foot plate and swingable by the control arms; a gear rack connected to each of the said operating arms; a rotatable shaft; a pinion secured to said shaft, said racks engaging opposite sides of the pinion to rotate the same; and a throttle actuating device connected to said shaft.

7. A throttle control means for motor vehicles comprising a foot plate; a support for said foot plate, said foot plate being adjustable in the plane of the supporting surface of said supporting means for securing said foot plate in its adjusted position; two control arms pivotally mounted on the foot plate and operable by either side of the driver's foot, and a throttle actuating device operable by said arms.

8. A throttle control means for motor vehicles comprising a foot plate; two control arms pivotally mounted on the foot plate and operable by either side of the driver's foot; a heel rest for the driver's foot; a freely rotatable disc between the two control arms; and a throttle actuating device operable by the said arms.

9. A throttle control means for motor vehicles comprising a foot plate; a support for said foot plate, said foot plate being adjustable in the plane of the supporting surface of said supporting means for securing said foot plate in its adjusted position; two control arms pivotally mounted on the foot plate and operable by either side of the driver's foot; a rotatable disc between the control arms; a heel rest secured to and adjustable with the foot plate; and a throttle actuating device operable by said arms.

10. Throttle control means for motor vehicles comprising a throttle actuating shaft; means for rotating said shaft; means for longitudinally moving said shaft; a sleeve movable longitudinally relative to the shaft; co-operating threads on the shaft and sleeve to impart to the sleeve a longitudinal movement relative to the shaft when the shaft is rotated; and means for connecting said sleeve to the throttle whereby the longitudinal movement of the sleeve relative to the shaft causes the throttle to open and close.

11. Throttle control means for motor vehicles comprising a throttle actuating shaft; means for rotating said shaft; means for longitudinally moving said shaft; a sleeve; co-operating threads on the shaft and the inner sleeve to impart to the sleeve a longitudinal movement relative to the shaft when the shaft is rotated; means connecting the sleeve to the throttle whereby the movement of the sleeve in the throttle opening direction causes the throttle to open; and spring means tending to close said throttle when the sleeve is moved in the opposite direction by rotation of or longitudinal movement of the shaft relative to the sleeve.

12. Throttle control means for motor vehicles comprising a throttle actuating shaft; means for rotating said shaft; means for longitudinally moving said shaft; an inner sleeve; an outer sleeve; co-operating threads on the shaft and inner sleeve to impart to the sleeve a longitudinal movement relative to the shaft when the shaft is rotated; means on the outer sleeve for engagement by the inner sleeve for imparting the movement of the inner sleeve in the throttle opening direction to the outer sleeve; means connecting the outer sleeve to the throttle whereby the movement of said outer sleeve in the throttle opening direction causes the throttle to open; and spring means tending to close said throttle when the said outer sleeve is moved in the opposite direction.

13. Throttle control means for motor vehicles comprising a throttle actuating shaft; means for rotating said shaft; means for longitudinally moving said shaft; an inner sleeve; an outer sleeve; co-operating threads on the shaft and inner sleeve to impart to the sleeve a longitudinal movement relative to the shaft when the shaft is rotated; a pin on the inner sleeve; a slot in the outer sleeve for the pin to prevent rotation of the inner sleeve; a shoulder on the outer sleeve for engagement by the inner sleeve for imparting the movement of the inner sleeve in the throttle opening direction to the outer sleeve; means connecting the outer sleeve to the throttle for opening said throttle; and spring means tending to close the throttle.

14. Throttle control means for motor vehicles comprising a depressible foot plate; two control arms pivotally mounted on the foot plate and operable by either side of the driver's foot; a shaft rotatable by each of the two arms; and a throttle actuating device connected to the shaft and having means to close the throttle when the plate is depressed.

15. Throttle control means for motor vehicles comprising a depressible foot plate; means for releasably holding the foot plate in its raised position; two control arms pivotally mounted on the foot plate and operable by either side of the driver's foot; a shaft rotatable by each of the two arms; and a throttle actuating device connected to the shaft and having means to close the throttle when the plate is depressed.

16. Throttle control means for motor vehicles comprising a depressible foot plate; a throttle actuating shaft connected to and longitudinally movable when the foot plate is depressed; means allowing the shaft to move longitudinally when the foot plate is depressed; a sleeve movable longitudinally relative to the shaft; co-operating threads on the shaft and sleeve to impart a longitudinal movement to the sleeve relative to the shaft when the shaft is rotated; and means for connecting said sleeve to the throttle whereby the relative longitudinal movement of the sleeve causes the throttle to open and close.

17. Throttle control means for motor vehicles comprising a depressible foot plate; means normally retaining the foot plate in a raised position; two control arms pivotally mounted at opposite ends on the foot plate and one of said arms being operable by the toe of the driver's foot and the other of said arms being operated by the heel of the driver's foot when turned or rotated; operating arms extending below the foot plate and swingable by the control arms; a gear rack connected to each of the said operating arms; a rotatable shaft; a pinion secured to said shaft, said racks engaging opposite sides of the pinion to rotate the same, said shaft being rotatable by said pinions and longitudinally movable when the foot plate is depressed; an inner sleeve; an outer sleeve; co-operating threads on the shaft and inner sleeve to impart a longitudinal movement to the inner sleeve relative to the shaft when the shaft is rotated; a pin on the inner sleeve; a slot in the outer sleeve for the pin to prevent rotation of the inner sleeve; a shoulder on the outer sleeve for engagement by the inner sleeve for imparting the movement of the inner sleeve in the throttle closing direction to the outer sleeve; means connecting the outer sleeve to the throttle for opening said throttle; and spring means tending to close the throttle.

18. Throttle control means for motor vehicles comprising a throttle actuating shaft; means for rotating said shaft; means for longitudinally moving said shaft; an inner sleeve; an outer sleeve; co-operating threads on the shaft and inner sleeve to impart to the sleeve a longitudinal movement relative to the shaft when the shaft is rotated; a pin on the inner sleeve; a slot in the outer sleeve for the pin to prevent rotation of the inner sleeve; a shoulder on the outer sleeve for engagement by the inner sleeve for imparting the movement of the inner sleeve in the throttle closing direction to the outer sleeve; means connecting the outer sleeve to the throttle for opening said throttle; and spring means tending to close the throttle.

ROBERT C. GIBSON.